US007970105B2

(12) United States Patent
Aydin et al.

(10) Patent No.: US 7,970,105 B2
(45) Date of Patent: Jun. 28, 2011

(54) SUBSCRIBER LINE MAINTENANCE APPARATUS AND METHODS

(75) Inventors: Arkin Aydin, Nepean (CA); Mary Ann Condie, Kanata (CA); Donald J. Procopio, Raleigh, NC (US); Franciscus M. Ploumen, Windsor, CA (US); Andrew Gordon Tomilson, Nepean (CA); Charles Michael Storry, Kemptville (CA); Stephen Haldane Wellington, Ottawa (CA)

(73) Assignee: Alcatel Lucent, Paris (FR)

( * ) Notice: Subject to any disclaimer, the term of this patent is extended or adjusted under 35 U.S.C. 154(b) by 1223 days.

(21) Appl. No.: 11/403,322

(22) Filed: Apr. 13, 2006

(65) Prior Publication Data
US 2007/0263778 A1  Nov. 15, 2007

(51) Int. Cl.
*H04M 1/24* (2006.01)
*H04M 3/08* (2006.01)
*H04M 3/22* (2006.01)
(52) U.S. Cl. ........................ 379/1.03; 379/28; 379/29.01
(58) Field of Classification Search ................. 379/1.01, 379/1.03, 1.04, 22, 22.02, 24, 27.06, 28, 379/29.01, 29.04, 325
See application file for complete search history.

(56) References Cited

U.S. PATENT DOCUMENTS

| 6,532,277 | B2 * | 3/2003 | Ulanskas et al. | 379/27.01 |
| 6,873,685 | B2 * | 3/2005 | Chong | 379/27.01 |
| 7,515,691 | B2 * | 4/2009 | Warner et al. | 379/1.04 |
| 2006/0176825 | A1 * | 8/2006 | Huang et al. | 370/241 |

* cited by examiner

*Primary Examiner* — Quoc D Tran
(74) *Attorney, Agent, or Firm* — Eckert

(57) ABSTRACT

Subscriber line maintenance apparatus and methods are disclosed. A maintenance operation is performed on a subscriber line in a communication system by an embedded test unit. The test unit limits an effect of the maintenance operation on communication signals that are transferred on the subscriber line during the maintenance operation. In one embodiment, the communication signals are high-frequency signals, and the limiting is achieved by performing the maintenance operation through a low-pass filter, such as the low pass filter of a Plain Old Telephone Service (POTS) splitter. The test unit may be implemented as a daughter card carried by another electronic circuit card in a Digital Subscriber Line Access Multiplexer (DSLAM), for example, so that the test unit does not occupy its own card slot in an equipment shelf. One, or more than one, test unit may be provided to serve multiple equipment shelves in a distributed communication equipment architecture.

23 Claims, 4 Drawing Sheets

SUBSCRIBER LINE MAINTENANCE APPARATUS AND METHODS

FIELD OF THE INVENTION

This invention relates generally to digital communications and, in particular, to maintenance operations on digital subscriber lines.

BACKGROUND

Maintenance functions on digital subscriber lines, such as Metallic Test Access (MTA) testing, commonly involve using external test heads located near communication equipment to be tested. These test heads tend to be expensive, consume valuable real estate, and also require cabling to connect to tested equipment. With distributed equipment architectures or smaller scale remote communication equipment, such as remote Digital Subscriber Line (DSL) Access Multiplexers (DSLAMs) that are deployed to extend the reach of DSL service from a Central Office (CO), the cost of providing a test head for each remote equipment installation compared to the number of ports (customers) served makes an external test head less attractive. Furthermore, the small cabinets that are often used for remote DSLAMs and other equipment have very little physical space to house a test head, and limited power and cooling capabilities.

Efforts have been made to reduce the size of external test heads so that they occupy less space. Test head products which can be accommodated in a communication equipment card slot are also available. However, in this case the test head occupies a card slot that would otherwise be available to deploy a line card for providing service to additional customers. With one less line card slot, the number of customers that can be serviced by a DSLAM or other equipment, as well as the revenue that can be generated using that equipment, are reduced.

Centralized resources such as a test head are also normally connected directly to a specific DSL line. Whenever a DSL port of a DSLAM is connected to a test head or other centralized resource or a test signal is applied to a port or line, for example, that DSL line experiences a disturbance in line conditions. Such a disturbance can result in bit errors or data communication functionality being lost altogether, causing the DSL line to retrain in order to re-establish the lost data link.

Thus, there remains a need for improved subscriber line maintenance techniques.

SUMMARY OF THE INVENTION

In accordance with an embodiment of the present invention, a test unit is embedded inside communication equipment such as a DSLAM. Significant size and cost savings can be realized by employing an embedded test unit instead of an external test head.

Some embodiments of the invention provide a communication equipment architecture that allows non-disruptive subscriber line maintenance operations, such as DSL line testing and/or application of sealing current.

According to an aspect of the invention, an apparatus includes a subscriber line maintenance module operable to perform a maintenance operation on a subscriber line in a communication system, and a maintenance interface operatively coupled to the subscriber line maintenance module, the maintenance interface enabling the subscriber line maintenance module to perform the maintenance operation on the subscriber line while limiting an effect of the maintenance module on communication signals that are transferred on the subscriber line.

The subscriber line maintenance module may be further operable to receive control information from maintenance equipment, and to perform the maintenance operation in response to the received control information.

The maintenance operation may include at least one of: a narrowband test operation and a sealing current operation.

If the subscriber line comprises a subscriber line capable of carrying communication signals at narrowband frequencies and broadband frequencies, the maintenance operation may include a narrowband frequency maintenance operation.

The apparatus may also include a broadband communication device that enables broadband communications over the subscriber line, a subscriber line interface for operatively coupling the broadband communication device to the subscriber line, and a narrowband filter operatively coupled to the maintenance interface and to the subscriber line interface.

In some embodiments, the broadband communication device includes a Digital Subscriber Line (DSL) modem, and the narrowband filter includes a low-pass filter in a Plain Old Telephone Service (POTS) splitter.

The apparatus may be implemented, for example, in communication equipment that also includes an equipment shelf comprising card slots for receiving respective electronic circuit cards. The card slots may include a card slot for receiving a common card that supports equipment shelf functions. In this case, the subscriber line maintenance module and the maintenance interface may be implemented on the common card as an integrated test unit.

The card slots may include a further card slot for receiving a further card that enables communications over the subscriber line, and the communication equipment may also include a connection between the further card slot and the maintenance interface on the common card. The subscriber line maintenance module may then be operable to perform the maintenance operation on the subscriber line through the maintenance interface and the connection.

In some embodiments, the communication equipment has a distributed architecture that includes the equipment shelf, a further equipment shelf comprising further card slots for receiving respective electronic circuit cards, the further card slots comprising a card slot for receiving a further card that enables communications over a further subscriber line, and a connection between the further equipment shelf and the maintenance interface on the common card. In this case, the subscriber line maintenance module may be operable to perform the maintenance operation on the further subscriber line through the maintenance interface and the connection.

The subscriber line maintenance module may be further operable to calibrate itself to the further equipment shelf.

If the communication equipment comprises a Digital Subscriber Line Access Multiplexer (DSLAM) having a subscriber line interface and a Plain Old Telephone Service (POTS) splitter operatively coupled to the subscriber line interface and to the card slot, the maintenance interface may be operatively coupled to the subscriber line interface through the card slot and a low-pass filter of the POTS splitter.

A method is also provided, and includes determining a maintenance operation to be performed on a subscriber line, performing the determined maintenance operation on the subscriber line, and limiting an effect of the maintenance operation on communication signals that are transferred on the subscriber line during the maintenance operation.

The method may also involve receiving control information from maintenance equipment, in which case determining may involve determining the maintenance operation based on the received control information.

The maintenance operation may include at least one of: a narrowband test operation and a sealing current operation.

Where the subscriber line comprises a subscriber line capable of carrying communication signals at narrowband frequencies and broadband frequencies, the maintenance operation may include a narrowband frequency maintenance operation, and limiting may involve low-pass filtering maintenance signals exchanged with the subscriber line.

The subscriber line may be one of a plurality of subscriber lines with which communication equipment exchanges communication signals. In this case, the method may also include determining on which of the plurality of communication lines the maintenance operation is to be performed.

The plurality of subscriber lines may include subscriber lines on which communications are enabled by electronic circuit cards installed in one or more equipment shelves. The method may then involve calibrating the maintenance operation for the electronic circuit card by which communications on the subscriber line are enabled.

In accordance with another aspect of the invention, communication equipment includes a broadband communication device that enables broadband communications over a subscriber line, a subscriber line interface for operatively coupling the broadband communication device to the subscriber line, and an embedded test unit, operatively coupled to the subscriber line interface, for performing a narrowband test on the subscriber line.

The embedded test unit may be further operable to output a sealing current to the subscriber line through the subscriber line interface.

In some embodiments, the communication equipment also includes a plurality of subscriber line interfaces, including the subscriber line interface, for respectively operatively coupling the broadband communication device to a plurality of subscriber lines, and the embedded test unit is operatively coupled to each subscriber line interface of the plurality of subscriber line interfaces.

The broadband communication device may be further operable to perform a broadband test on the subscriber line.

A Digital Subscriber Line (DSL) port circuit is also provided, and includes a sealing current generator, and an output, operatively coupled to the sealing current generator and to a dedicated low-pass filter for a DSL port, for outputting sealing current generated by the sealing current generator to the DSL port through the low-pass filter.

Other aspects and features of embodiments-of the present invention will become apparent to those ordinarily skilled in the art upon review of the following description.

BRIEF DESCRIPTION OF THE DRAWINGS

Examples of embodiments of the invention will now be described in greater detail with reference to the accompanying drawings.

DETAILED DESCRIPTION OF PREFERRED EMBODIMENTS

Figure 1:
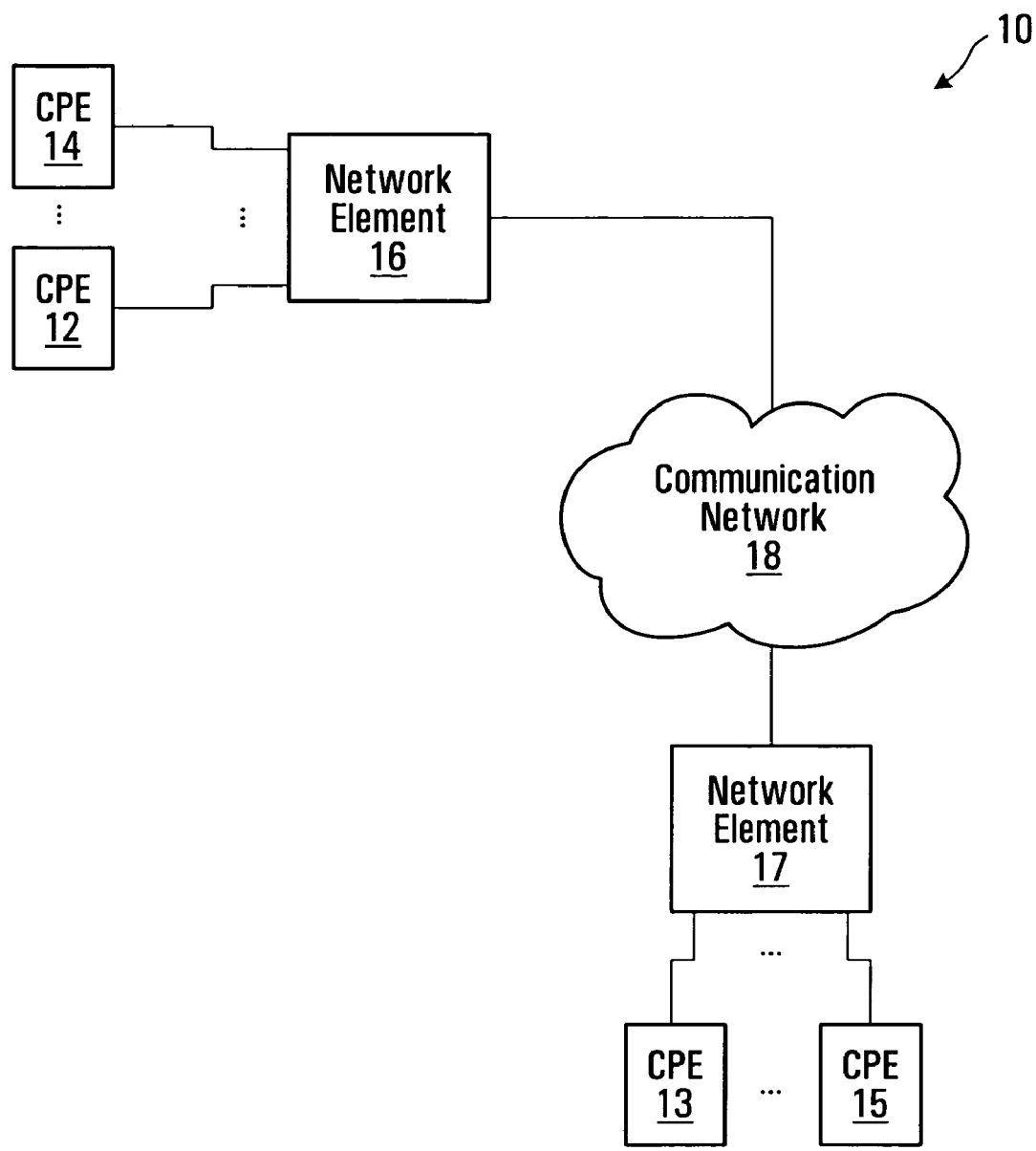
FIG. 1 is a block diagram of a communication system.

FIG. 1 is a block diagram of a communication system 10, in which embodiments of the invention could be implemented.

The communication system 10 includes multiple Customer Premises Equipment (CPE) installations 12/14, 13/15, network elements 16, 17, and a communication network 18. Although only four CPEs 12/14, 13/15 and two network elements 16, 17 have been shown in FIG. 1 to avoid overly complicating the drawing, many more CPEs and network elements may be connected to the communication network 18. It should therefore be appreciated that the system of FIG. 1, as well as the contents of the other drawings, are intended solely for illustrative purposes, and that the present invention is in no way limited to the particular example embodiments explicitly shown in the drawings and described herein.

The CPEs 12/14, 13/15 represent communication equipment, illustratively end user communication devices, configured to receive and/or transmit communication signals. Although shown as being directly connected to the network elements 16, 17, it will be apparent that CPEs 12/14, 13/15 may communicate with the network elements 16, 17 through other intermediate components (not shown). In one embodiment, the CPE connections are local twisted pair loops used for DSL communications.

Switches and routers are illustrative of the types of communication equipment represented by the network elements 16, 17. For example, where the CPE connections are DSL connections, the network elements 16, 17 may be DSLAMs.

The communication network 18, in addition to the network elements 16, 17, may also include other network elements which route communication signals through the communication network 18.

Many different types of end user, intermediate, and network communication equipment, as well as the operation thereof, will be apparent to those skilled in the art. In general, the network elements 16, 17 transfer communication signals between the communication network 18 and the CPEs 12/14, 13/15. According to one particular example implementation, the network elements 16, 17 communicate with other equipment in the communication network 18 through Gigabit-Ethernet (Gig-E) communication links, and communicate with the CPEs 12/14, 13/15 through DSL. However, embodiments of the invention are not limited to any particular types of communication equipment, transfer mechanisms, or protocols. The architectures and techniques disclosed herein may be used in conjunction with other than Ethernet and DSL communications.

As noted above, it may be desirable to distribute, rather than centralize, communication equipment. Communications over DSL, for instance, can be improved by locating communication network access equipment such as DSLAMs as close as possible to CPEs. Distributed systems, however, can present challenges in respect of maintenance operations. In accordance with an embodiment of the invention, maintenance capabilities are integrated into distributed communication equipment.

Figure 2:
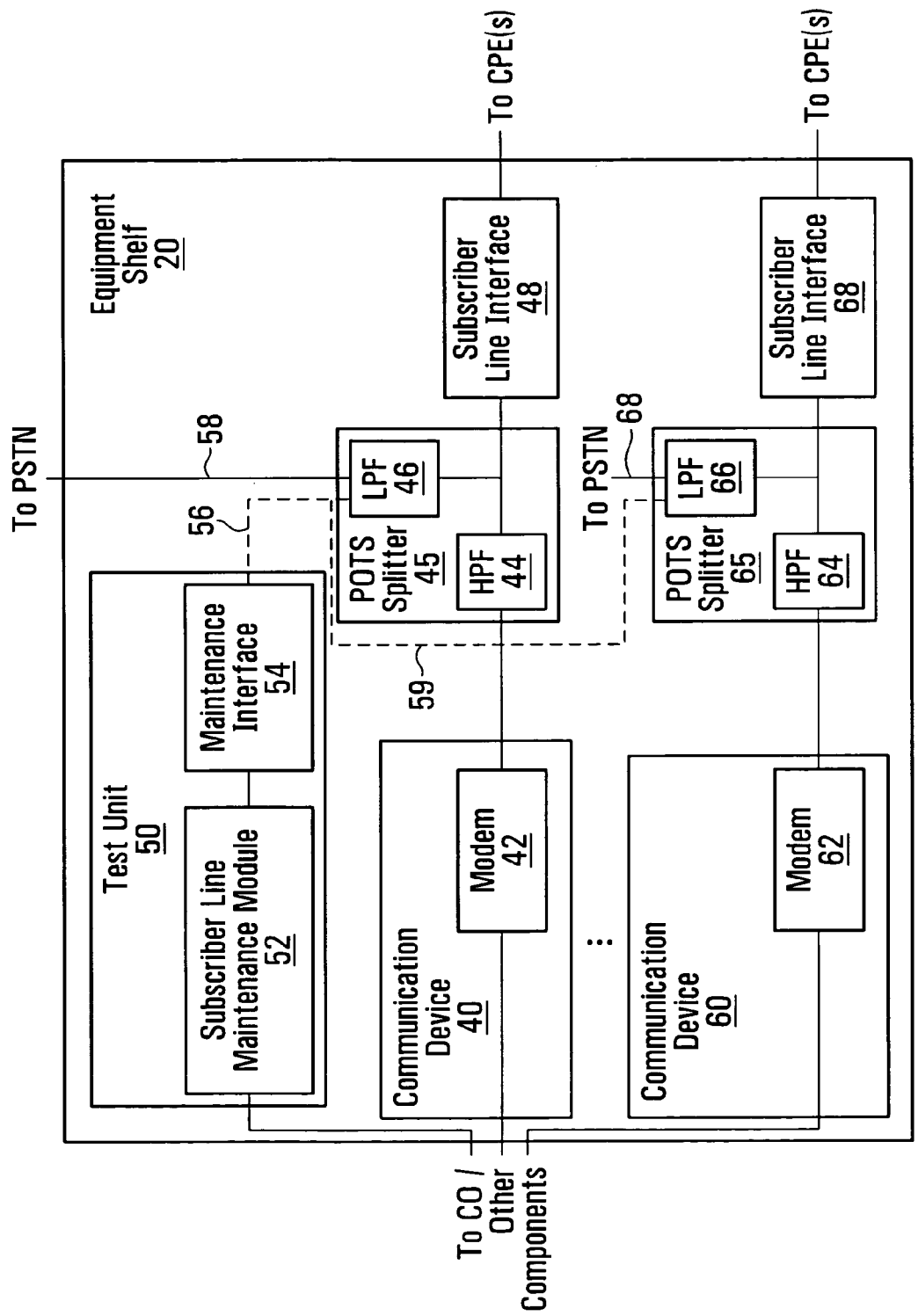
FIG. 2 is a block diagram of communication equipment.

FIG. 2 is a block diagram of communication equipment. The communication equipment 20 includes an embedded test unit 50, communication devices 40, 60 that include respective modems 42, 62, and subscriber line interfaces 48, 68 that are operatively coupled to the test unit 50 and to the modems 42, 62 through Plain Old Telephone Service (POTS) splitters 45, 65.

The communication equipment 20 represents an example of one possible implementation of one embodiment of the invention. Other embodiments having fewer, further, or different components with similar or different interconnections are also contemplated. The invention is in no way limited to the specific example shown in FIG. 2. For example, although DSL communications as described in detail herein are useful in illustrating embodiments of the invention, the present invention may also be used in conjunction with other types of subscriber lines.

The types of connections through which the components of FIG. 2 are operatively coupled may, to at least some extent, be implementation-dependent. Communication equipment components often use various types of physical connectors and wired connections. In the case of cooperating software functions, for example, an operative coupling may be through variables or registers, and thus be more so a logical coupling than a direct physical coupling.

The communication devices 40, 60 may be implemented, for example, in DSL line cards for installation in a DSLAM. In this case, the subscriber lines to CPEs serviced by the communication devices 40, 60 are DSL lines that carry data at broadband frequencies, generally above 20 kHz and typically higher, and may also carry voice at lower narrowband frequencies. The high-pass filters (HPFs) 44, 64 and the low-pass filters (LPFs) 46, 66 in the POTS splitters 45, 65 are commonly used in DSL line cards, or sometimes on separate port cards or "appliques".

A common implementation of the modems 42, 62, DSL modems in this example, is in DSL chipsets. Such a chipset may provide, in addition to modem functionality, maintenance operation functionality and/or filtering capabilities when suitably configured using software. More generally, hardware, software, firmware, or combinations thereof may be used to implement the modems 42, 62 and possibly other components of the communication devices 40, 60 and/or the communication equipment 20. Electronic devices that may be suitable for this purpose include, among others, microprocessors, microcontrollers, Programmable Logic Devices (PLDs), Field Programmable Gate Arrays (FPGAs), Application Specific Integrated Circuits (ASICs), and other types of "intelligent" integrated circuits.

Those skilled in the art will be familiar with POTS splitters such as 45, 65 and the internal details and operation thereof. The simple representation of the POTS splitters 45, 65 in the communication devices 40, 60, including the HPFs 44, 64 and the LPFs 46, 66, is solely for illustration. Some modems, for example, incorporate high-pass filters and thus a POTS splitter that is used with such a modem need not incorporate its own HPF. As discussed in further detail below, the LPFs 46, 66 of the POTS splitters 45, 65, which are normally provided to separate high-frequency data traffic from low-frequency voice traffic that might be switched in a Public Switched Telephone Network (PSTN), is also used in some embodiments to limit the effects of maintenance operations that are performed by the test unit 50.

The subscriber line interfaces 48, 68 represent interfaces through which the communication devices 40, 60 exchange communication signals with CPEs. Where a CPE subscriber line is a DSL connection, the interfaces 48, 68 may include physical ports and associated DSL port circuitry. Other examples of subscriber line interfaces will be apparent to those skilled in the art.

Line cards and other communication devices may support subscriber lines with more than one remote device such as a CPE. A single DSL line card might support 24, 48, or more ports and customer connections, for example. It should therefore be appreciated that the techniques disclosed herein may be applied to one, or more than one, subscriber line.

The test unit 50 includes a subscriber line maintenance module 52 that is operatively coupled to a maintenance interface 54. The maintenance interface 54 operatively couples the subscriber line maintenance module 52 to a subscriber line to be tested. In the communication equipment 20, the maintenance interface 54 couples the subscriber line maintenance module 52 to a subscriber line that is supported by the communication device 40 through a connection 56, the LPF 46, and the subscriber line interface 48. The type of the connection 56 may vary between different implementations of communication equipment.

According to one possible implementation, the test unit 50 is provided on a "daughter" card that physically sits on another electronic circuit card of the communication equipment 20. The other electronic circuit card may be a common card on which generic equipment and/or shelf functions such as alarm collection and reporting are supported, for example. The maintenance interface 54 may then include a conductor that is brought into contact with a test bus system in the equipment 20 when the daughter card is installed in or on the other card, and that other card is installed in a communication equipment card slot.

The connection 56 may be a switched low-frequency bus or path in the communication equipment, and the test unit 50 may thereby be connected to a subscriber line by switching the path between multiple communication devices 40, 60 in an equipment shelf. In one possible embodiment, the connection 56, and similarly the connection 59 to the POTS splitter 65 and the subscriber line interface 68, is established by controlling relay matrices or other controllable switch elements depending on the particular subscriber line on which a maintenance operation is to be performed.

This type of implementation, with a daughter card and an internal switched maintenance path, provides an embedded test unit without occupying a separate line card slot, but is not the only possible implementation of an embedded test unit.

As noted above, components of the communication equipment 20, including the test unit 50, may be implemented using hardware, software, and/or firmware. The test unit 50 is therefore described herein primarily in terms of its function. Based on the functional description, a person skilled in the art will be enabled to implemented the test unit 50 in any of various ways.

In operation, the subscriber line maintenance module 52 is capable of performing maintenance operations on a subscriber line. The maintenance operations may include, for example, narrowband tests such as those specified in the GR-909 industry specification, or the more full-featured GR-844 tests. Those skilled in the art will be familiar with the GR-909 and GR-844 industry specifications. The GR-909 tests cover the majority of faults that are typically found in the field, but allows for smaller and simpler circuitry and functionality in the test unit 50.

Another maintenance operation that may be performed by the subscriber line maintenance module 52 is the application of a sealing current, where a subscriber line is implemented using a copper line. When a DSL loop carries only data and not voice, which is generally referred to as "naked" or "dry" DSL, unsoldered connections in the physical line may become corroded over time, degrading data communications. The electrical current associated with low-frequency voice transmissions on a DSL loop would normally avoid such corrosion. For data-only DSL implementations, a direct current, commonly referred to as a sealing or wetting current, is periodically applied to the line. Thus, it should be appreciated that the POTS splitters 45, 65 might not actually be connected to a PSTN as shown at 58, 68 in all embodiments. For flexibility, a DSL line card or port card might incorporate a POTS splitter 45, 65 so that it could be used in voice/data or data-only applications, but the POTS splitter might not always be used for voice traffic.

The subscriber line maintenance module 52 may thus include such components as a testing module and/or a sealing current generator, and an output, operatively coupled to the testing module/sealing current generator and to an LPF 46, 66. In some embodiments, the LPFs 46, 66 are dedicated LPFs for the subscriber line interfaces 48, 68, illustratively DSL ports. Maintenance signals, including testing signals generated and received by the testing module and/or sealing current generated by the sealing current generator, can then be exchanged with the subscriber lines through the LPFs 46, 66.

Control of maintenance operations performed by the subscriber line maintenance module 52 may be internal to the module itself, where the module is configured to determine maintenance operations or to periodically perform certain operations such as a sealing current operation for instance, or external. The subscriber line maintenance module 52 may be operable to receive control information from a control card in a DSLAM, or even from remote maintenance equipment such as an operator terminal at a CO, for example. Any of various mechanisms may be used to transfer control information from maintenance equipment, including but not limited to signalling over a dedicated control path or in-band signalling over a traffic/control communication path.

Other components that have not been explicitly shown in FIG. 2 may be involved in transferring control information and communication traffic to the modems 42, 62 and the subscriber line maintenance module 52. In a DSLAM, for example, communications with a CO may be enabled by a Gig-E interface that exchanges information with the modems 42, 62 and the subscriber line maintenance module 52.

Responsive to either an internal trigger, in the case of internal control for a scheduled maintenance operation for instance, or received control information, the subscriber line maintenance module 52 performs a maintenance operation on a subscriber line to which a subscriber line interface 48, 68 is operatively coupled. The maintenance interface 54 enables the subscriber line maintenance module 52 to perform the maintenance operation on the subscriber line while also limiting an effect of the maintenance operation on communication signals that are transferred on the subscriber line during the maintenance operation.

In the communication equipment 20, this limiting function of the maintenance interface 54 is provided by operatively coupling the subscriber line maintenance module 52 to a subscriber line through the LPF 46, 66 in the POTS splitter 45, 65, which in a multiple-interface DSL line or port card would typically be implemented as a per-port circuit. By connecting the subscriber line maintenance module 52 to the line in this manner, any disturbance to the line is greatly diminished and thus the subscriber line can be tested or sealing current can be applied in a "hitless" manner.

It should be recalled that conventional external test units would test a line or apply sealing current directly at a DSL port, causing communication errors and possibly loss of at least data communication functions during the testing or sealing current application. According to an aspect of the invention, narrowband testing signals and sealing currents are instead applied through an LPF 46, 66 of a POTS splitter 45, 65. This limits the effects of the testing or sealing current in that the actual customer connection is shielded from high-frequency effects of connecting the test unit 50 to the subscriber line. At least high-frequency data communication signals can thus be transferred on the subscriber line even during a maintenance operation.

The LPFs 46, 66 may thus be considered examples of an isolator or de-coupler, in that they isolate or de-couple the subscriber line maintenance module 52 from subscriber lines. High-frequency line disturbances associated with connection of the subscriber line maintenance module 52 to a subscriber line can thereby be significantly reduced or eliminated.

In some embodiments, the communication devices 40, 60 also have link maintenance capabilities. The embedded test unit 50 might perform narrowband maintenance operations, for example, and the modems 42, 62 or another component of the communication devices 40, 60 may be operable to perform broadband tests such as Single-and/or Dual-Ended Line Testing (SELT/DELT) or other high-frequency maintenance operations on subscriber lines. The combination of an embedded test unit 50 that has narrowband link maintenance capabilities with a broadband communication device that has broadband link maintenance capabilities can cover a wide range of link maintenance operations. Using an embedded test unit 50 thus does not necessarily significantly impact the range of testing and other subscriber line maintenance operations that are available.

The communication equipment 20 may enable communications over multiple subscriber lines and interfaces 48, 68. In this case, the subscriber line maintenance module 52 and the maintenance interface 54 use some sort of selection or addressing mechanism to perform maintenance operations on specific subscriber lines. As noted above, this may be accomplished in one possible implementation by providing a switched maintenance path in the equipment 20.

Figure 3:
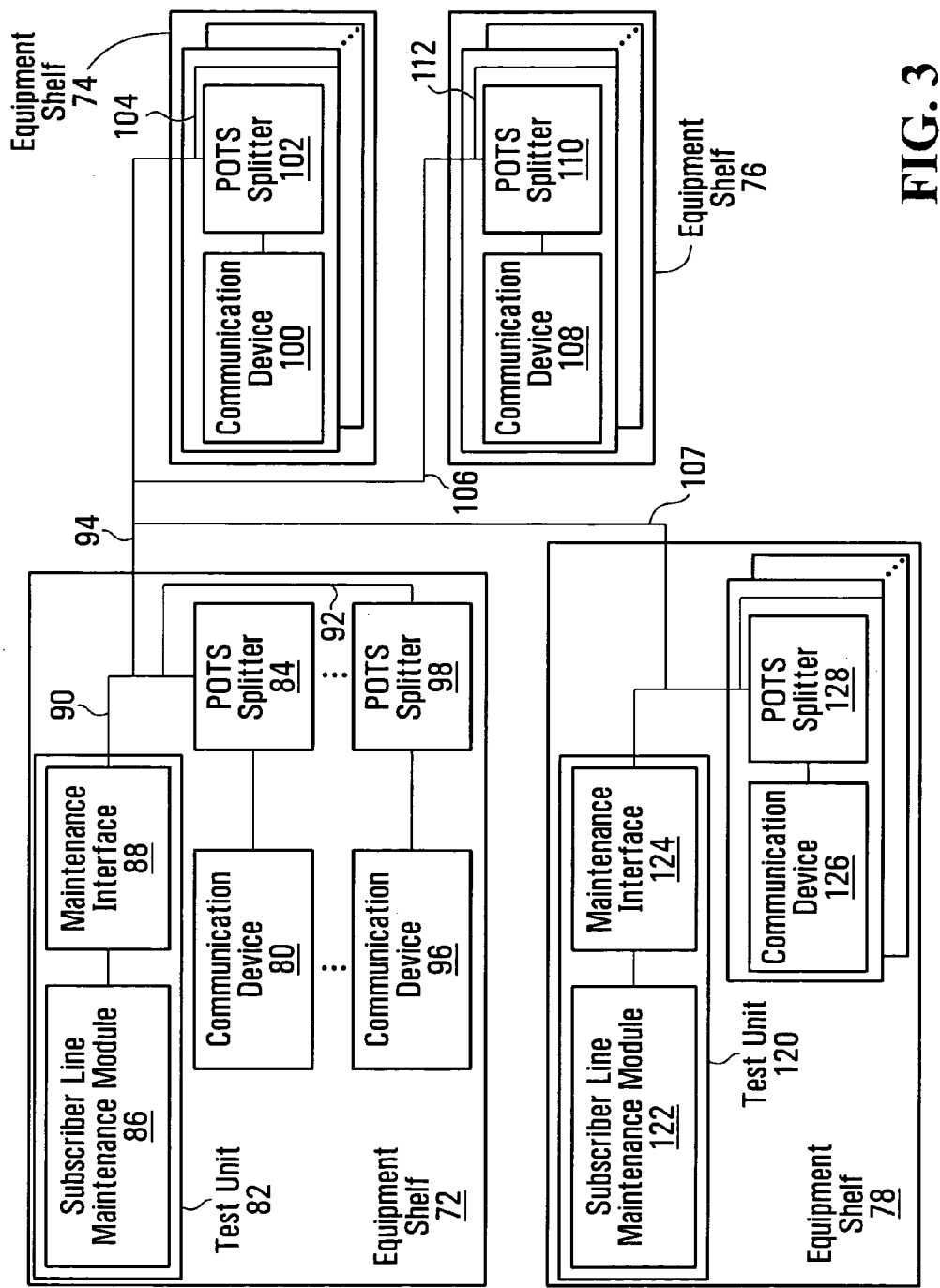
FIG. 3 is a block diagram of a distributed communication equipment architecture.

FIG. 2 and the foregoing description thereof relate to embodiments of the invention as applied to the subscriber line(s) associated with communication equipment having a single equipment shelf. The present invention can also be extended beyond single-shelf implementations, to communication link maintenance operations in multiple shelves of a distributed communication equipment architecture. FIG. 3 is a block diagram of one such architecture 70.

For simplicity, internal details of the communication devices 80, 96, 100, 108, 126 have not been included in FIG. 3. The communication equipment shelf 72 may be substantially the same as the communication equipment 20 (FIG. 2), and includes a test unit 82, communication devices 80, 96, and POTS splitters 84, 98. The test unit 82 includes a subscriber line maintenance module 86 and a maintenance interface 88 that is operatively coupled to the subscriber line maintenance module 86 and to the POTS splitter 84 through a connection 90. The maintenance interface 88 is also operatively coupled to the POTS splitter(s) 98, to which the communication device(s) 96 are operatively coupled, through a respective connection 92. The connection(s) 92 may be implemented as a switched maintenance path that includes backplane conductors and relays or other switchable elements, for example.

The communication devices 80, 96 represent communication devices that are installed in one equipment shelf 72. As described above with reference to FIG. 2, the single test unit 82 may perform maintenance operations on any of the subscriber lines supported by any of the communication devices 80, 96 in an equipment shelf.

The distributed architecture 70 also includes other equipment shelves 74, 76, 78 in which other communication devices 100, 108, 126 have been installed. Examples of distributed architectures in which the shelf 72 is a host shelf and the shelves 74, 76, 78 are expansion shelves have been disclosed in co-pending and commonly assigned U.S. patent application Ser. No. 11/264,451, entitled "REMOTE CONTROL AND REDUNDANCY FOR DISTRIBUTED COMMUNICATION EQUIPMENT", and filed on Nov. 1, 2005, and Ser. No. 11/264,475, entitled "DISTRIBUTED COMMUNICATION EQUIPMENT ARCHITECTURES AND TECHNIQUES", and also filed on Nov. 1, 2005, the entire contents of both of which are incorporated herein by reference.

The communication devices 100, 108, 126 may have a substantially similar structure, and are identical line cards in some embodiments. Metal test cables or other connections 94, 106, 107 may be used to provide an external maintenance path between the test unit 82 and the shelves 74, 76, 78. Paths to each subscriber line supported by the communication devices 100, 108, 126 may be completed through internal switched maintenance paths or other types of connections such as 104, 112 to further POTS splitters.

The shelves 72, 74, 76, 78 may be connected serially through the connections 94, 106, 107. Star-or hub-type inter-shelf connections as shown, as well as other topologies, are also possible. As described above with reference to FIG. 2, any subscriber line supported by communication equipment can be connected to an internal maintenance path. The internal maintenance path may be coupled at a central access point to an internal test unit such as 82 or, through external connections 94, 106, 107 to a test unit in another equipment shelf.

The equipment shelf 78 illustrates another possible embodiment of the invention, in which multiple shelves in a distributed communication equipment architecture include respective test units. The equipment shelf 78 is part of the same distributed communication equipment as the shelves 72, 74, 76, but has its own test unit 120 and thus need not necessarily be coupled to the other shelves 72, 74, 76 for subscriber line maintenance purposes. The equipment shelf 72 may be a host shelf for other purposes such as transferring communication traffic. However, the test unit 120 allows multiple maintenance operations to be performed by the subscriber line maintenance module 122 and the maintenance interface 124 on subscriber lines supported by the communication device(s) 126 and the subscriber line interface(s) 128 while a maintenance operation is simultaneously being performed in one of the equipment shelves 72, 74, 76. Each test unit 82, 120 may independently perform maintenance operations. Maintenance operations for the shelf 78 may be performed by either its test unit 120 or the test unit 82.

Thus, in a distributed architecture, one, some, or all equipment shelves may include an internal test unit.

In the case of a shared test unit that is operatively coupled to other equipment shelves through external metal test cables, those skilled in the art will appreciate that the lengths of such cables have practical limits. Testing results, for example, can be inaccurate for longer cable lengths. This issue is addressed in some embodiments of the invention by implementing calibration functionality at an internal test unit.

With reference to FIG. 3, the subscriber line maintenance module 86 may be capable of calibrating itself internally, to the specific communication device and interface of the subscriber line on which a maintenance operation is to be performed, and/or externally, to a different shelf. External calibration may also extend to the device/interface level.

Calibration generally involves determining an offset to account for the effects of components such as a metal test cable between a test unit and a subscriber line on which a maintenance operation is to be performed. For internal calibration, the subscriber line maintenance module 86 may determine and store offsets for each of the subscriber lines supported by the communication devices 80, 96 in the shelf 72. Offsets may similarly be determined and stored for subscriber lines supported in the expansion shelves 74, 76. A measurement or other type of reading made during a subscriber line maintenance operation can then be adjusted by the offset for that subscriber line. Offsets thereby compensate for intermediate components in an operative coupling between a test unit and a subscriber line, allowing longer test cables to be used between an expansion equipment shelf and an embedded test unit in another equipment shelf, for example.

The calibration can thus be done within a test unit or shelf to allow the test unit to improve its own internal testing accuracy. Calibration to an equipment shelf boundary adjusts results to eliminate the impact of external test cables. This allows a test unit to have accurate measurements in a remote shelf as well. A third possible type of calibration is to improve the results of testing such as SELT/DELT that may be performed by other components. A test unit might not itself be directly involved in calibrating other components, but may provide reference terminations that could be used by the other components during their calibration functions. SELT/DELT, for example, tends to be extremely sensitive to component variations, and it may thus be useful to support modem calibration for SELT/DELT.

In one embodiment, the type of calibration performed by the subscriber line maintenance module 86 is controllable. Calibration might not significantly improve the accuracy of measurements on subscriber lines supported on the communication device 80, for example, since the paths between the subscriber line maintenance module 86 and those subscriber lines include relatively few intermediate components. Paths to the subscriber lines supported by the other communication device(s) 96 in the equipment shelf 72 may include longer internal connections with more intermediate components, and therefore internal calibration may be desirable for those subscriber lines. Since the paths to the subscriber lines supported by the communication devices 100, 108 in the other equipment shelves 74, 76 include external connections such as metal test cables, calibration may be most useful for those subscriber lines.

As noted above, the maintenance operations performed by the subscriber line maintenance module 86 may be remotely controllable. Calibration by the subscriber line maintenance module 86 may be controlled in a similar manner, through a dedicated control path, in-band control signalling, or some other mechanism.

Figure 4:
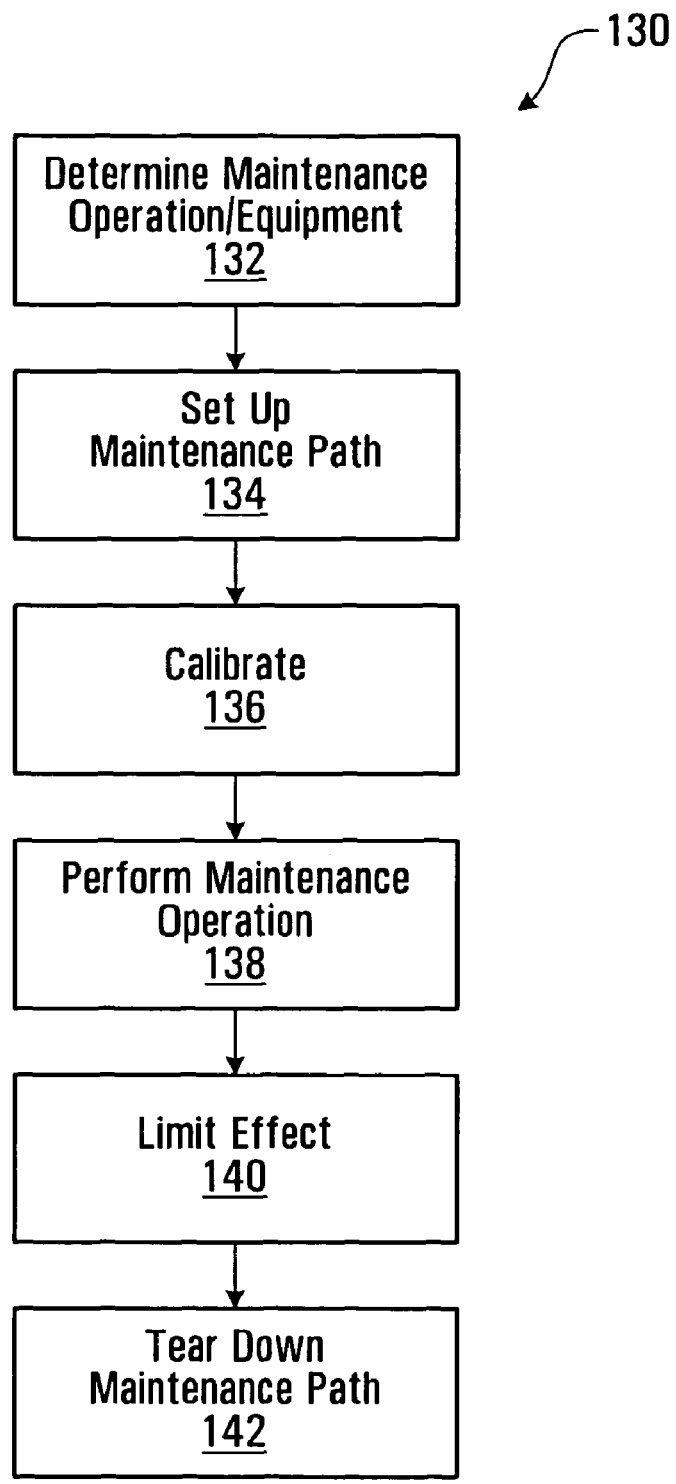
FIG. 4 is a flow diagram of a subscriber line maintenance method.

FIG. 4 is a flow diagram of a subscriber line maintenance method. The method 130 includes determining, at 132, a maintenance operation to be performed on a subscriber line. As shown, this may involve identifying particular equipment that supports the subscriber line on which the maintenance operation is to be performed.

A maintenance path to the subscriber line is then set up at 134, illustratively by controlling relays in a switched maintenance path. The maintenance path established at 134 may include external cables in a distributed architecture. In this case, one or more calibration functions may be performed at 136. As noted above, internal calibration is also possible, and therefore calibration is not necessarily restricted to distributed architectures.

At 138, the determined maintenance operation is performed on the subscriber line. As shown at 140, an effect of the maintenance operation on communication signals that are transferred on the subscriber line during the maintenance operation is limited. The maintenance path may then be torn down at 142, such as by resetting relays in a switched maintenance path to default positions.

It should be appreciated that the method 130 is illustrative of one embodiment of the invention. Other embodiments may include further, fewer, or different operations performed in a similar or different order than shown. For example, although the limiting operation is shown separately at 140 in FIG. 4, it will be apparent from the foregoing description of FIGS. 2 and 3 that the manner in which a maintenance operation is performed may itself limit the effects of that maintenance operation on communication signals. Where the subscriber line on which the maintenance operation is to be performed is capable of carrying communication signals at narrowband frequencies and broadband frequencies for instance, limiting may involve low-pass filtering maintenance signals exchanged with the subscriber line.

The method 130 might also be remotely controlled, and may thus involve receiving control information from maintenance equipment and determining the maintenance operation at 132 based on the received control information.

Maintenance operations may be performed on multiple subscriber lines, in which case the operations of the method 130 may be repeated for each subscriber line.

Further variations may be or become apparent to those skilled in the art.

According to embodiments of the invention as disclosed herein, by embedding a test unit in a DSLAM, for example, substantial size and cost savings can be realized. Furthermore, external cabling can be reduced or eliminated and the co-ordination between the DSLAM and the test unit is greatly simplified. Narrowband tests supported by an embedded test unit can complement SELT/DELT provided by DSL line cards in a DSLAM.

In a distributed equipment architecture having multiple equipment shelves, a respective embedded test unit may be provided for any or all shelves, to allow maintenance operations to be performed simultaneously in different shelves.

Providing an internal test unit on a daughter card that mounts onto an existing card in a DSLAM or other communication equipment avoids the use of an additional slot for the internal test unit.

Internal test units have another advantageous feature over external test units in that they can be more accurately calibrated to account for internal system loading.

In some embodiments, a test access point is coupled to a customer line through an LPF of a customer link circuit, illustratively through the LPF of a POTS splitter, so as not to disrupt broadband connections during narrowband testing. This avoids, and reduces the risk of, any service disruption to the end-user.

An equipment maintenance architecture according to an embodiment of the invention may be especially well suited to this time of transition, as the public moves from the use of traditional POTS to dry line Voice Over Internet Protocol (VOIP) services, and can be configured for either type of service. It is anticipated that in the future there will be a great increase in number of dry DSL lines. Implementing a separate sealing current circuit on every port would incur significant costs. Embodiments of the invention allow a single sealing current generator to apply sealing current to each subscriber line interface in communication equipment, whether that equipment includes one, or more than one, equipment shelf.

In addition, as described above, applying a sealing current directly to a DSL port can cause a service disruption. The techniques disclosed herein can be used to apply sealing currents without disrupting customer communications or service.

What has been described is merely illustrative of the application of principles of embodiments of the invention. Other arrangements and methods can be implemented by those skilled in the art without departing from the scope of the present invention.

For example, the division of functions shown in FIGS. 2-4 are illustrative of embodiments of the invention. Further, fewer, or different elements may be used to implement the techniques disclosed herein.

In addition, although described primarily in the context of methods and systems, other implementations of the invention are also contemplated, as instructions stored on a machine-readable medium for example.

We claim:

1. An apparatus comprising:
   a communication device that enables transfer of communication signals over a subscriber line in a communication system;
   a subscriber line maintenance module operable to perform a maintenance operation on the subscriber line by transferring over the subscriber line signals having frequencies below frequencies of the communication signals; and
   a low-pass filter operatively coupled to the subscriber line maintenance module to filter the signals transferred over the subscriber line during the maintenance operation, to limit an effect of the maintenance operation on the communication signals that are transferred over the subscriber line.

2. The apparatus of claim 1, wherein the subscriber line maintenance module is further operable to receive control information from maintenance equipment, and to perform the maintenance operation in response to the received control information.

3. The apparatus of claim 1, wherein the maintenance operation comprises at least one of: a narrowband test operation and a sealing current operation.

4. The apparatus of claim 1, wherein the subscriber line comprises a subscriber line capable of carrying communication signals at narrowband frequencies and broadband frequencies, and wherein the maintenance operation comprises a narrowband frequency maintenance operation.

5. The apparatus of claim 4, further comprising:
   a subscriber line interface operatively coupled to the communication device and to the low-pass filter for operatively coupling the communication device and the low-pass filter to the subscriber line.

6. The apparatus of claim 5, wherein the communication device comprises a Digital Subscriber Line (DSL) modem, and wherein the low-pass filter comprises a low-pass filter in a Plain Old Telephone Service (POTS) splitter.

7. Communication equipment comprising:
   the apparatus of claim 1; and
   an equipment shelf comprising card slots for receiving respective electronic circuit cards, the card slots comprising a card slot for receiving a common card that supports equipment shelf functions,
   wherein the subscriber line maintenance module is implemented on the common card as an integrated test unit.

8. The communication equipment of claim 7, wherein the card slots comprise a further card slot for receiving a further card comprising the communication device, and wherein the communication equipment further comprises:
   a connection between the further card slot and the subscriber line maintenance module on the common card,
   wherein the subscriber line maintenance module is operable to perform the maintenance operation on the subscriber line through the connection.

9. The communication equipment of claim 7, wherein the communication equipment has a distributed architecture comprising:
   the equipment shelf;

a further equipment shelf comprising further card slots for receiving respective electronic circuit cards, the further card slots comprising a card slot for receiving a further card that enables communications over a further subscriber line; and a connection between the further equipment shelf and the subscriber line maintenance module on the common card, wherein the subscriber line maintenance module is operable to perform the maintenance operation on the further subscriber line through the connection.

10. The communication equipment of claim 9, wherein the subscriber line maintenance module is further operable to calibrate itself to the further equipment shelf.

11. The communication equipment of claim 7, wherein the communication equipment comprises a Digital Subscriber Line Access Multiplexer (DSLAM) having a subscriber line interface and a Plain Old Telephone Service (POTS) splitter operatively coupled to the subscriber line interface and to the card slot, the low-pass filter comprising a low-pass filter of the POTS splitter, the subscriber line maintenance module being operatively coupled to the subscriber line interface through the card slot and the low-pass filter of the POTS splitter.

12. A method comprising:
a subscriber line maintenance module determining a maintenance operation to be performed on a subscriber line in a communication system and performing the determined maintenance operation on the subscriber line by transferring over the subscriber line signals having frequencies below frequencies of communication signals that are used in communications over the subscriber line; and a low-pass filter, operatively coupled to the subscriber line maintenance module, filtering the signals transferred over the subscriber line during the maintenance operation, to limit an effect of the maintenance operation on the communication signals that are transferred over the subscriber line.

13. The method of claim 12, further comprising:
receiving control information from maintenance equipment,
wherein determining comprises determining the maintenance operation based on the received control information.

14. The method of claim 12, wherein the maintenance operation comprises at least one of: a narrowband test operation and a sealing current operation.

15. The method of claim 12, wherein the subscriber line comprises a subscriber line capable of carrying communication signals at narrowband frequencies and broadband frequencies, wherein the maintenance operation comprises a narrowband frequency maintenance operation.

16. The method of claim 12, wherein the subscriber line is one of a plurality of subscriber lines with which communication equipment exchanges communication signals, the method further comprising:
determining on which of the plurality of communication lines the maintenance operation is to be performed.

17. The method of claim 16, wherein the plurality of subscriber lines comprises subscriber lines on which communications are enabled by electronic circuit cards installed in one or more equipment shelves.

18. The method of claim 17, further comprising:
calibrating the maintenance operation for the electronic circuit card by which communications on the subscriber line are enabled.

19. Communication equipment comprising:
a broadband communication device that enables broadband communications over a subscriber line;
a subscriber line interface for operatively coupling the broadband communication device to the subscriber line;
a low-pass filter operatively coupled to the subscriber line interface; and
an embedded test unit operatively coupled to the low-pass filter, the embedded test unit being operatively coupled to the subscriber line interface through the low-pass filter, for performing narrowband testing on the subscriber line through the low-pass filter,
the low-pass filter being operatively coupled between the embedded test unit and the subscriber line interface to filter signals exchanged with the subscriber line during the narrowband testing, to limit an effect of the narrowband testing on broadband communications over the subscriber line.

20. The communication equipment of claim 19, wherein the embedded test unit is further operable to output a sealing current to the subscriber line through the low-pass filter and the subscriber line interface.

21. The communication equipment of claim 19, further comprising:
a plurality of subscriber line interfaces, including the subscriber line interface, for respectively operatively coupling the broadband communication device to a plurality of subscriber lines, and
a plurality of low-pass filters, including the low-pass filter, for respectively operatively coupling the embedded test unit to the plurality of subscriber line interfaces.

22. The communication equipment of claim 19, wherein the broadband communication device is further operable to perform broadband testing on the subscriber line through the subscriber line interface.

23. A Digital Subscriber Line (DSL) port circuit comprising:
a DSL port for connection to a subscriber line;
a dedicated high-pass filter for the DSL port, the dedicated high-pass filter being operatively coupled to the DSL port for filtering signals exchanged between the DSL port and a broadband communication device that enables broadband communications over the subscriber line through the DSL port;
a sealing current generator; and
a dedicated low-pass filter for the DSL port, the dedicated low-pass filter being operatively coupled to the DSL port and to the sealing current generator, the sealing current generator being operatively coupled to the DSL port through the dedicated low-pass filter,
the dedicated low-pass filter being operatively coupled between the sealing current generator and the DSL port to filter a sealing current generated by the sealing current generator, to limit an effect of the sealing current on broadband communications over the subscriber line during application of the sealing current to the subscriber line.

* * * * *